J. F. APPLEBY.
COTTON PICKING MACHINE.
APPLICATION FILED JULY 23, 1908. RENEWED MAY 27, 1913.

1,078,327.

Patented Nov. 11, 1913.
2 SHEETS—SHEET 1.

Witnesses:

Inventor:
John F. Appleby,
By G. L. Cragg
Atty

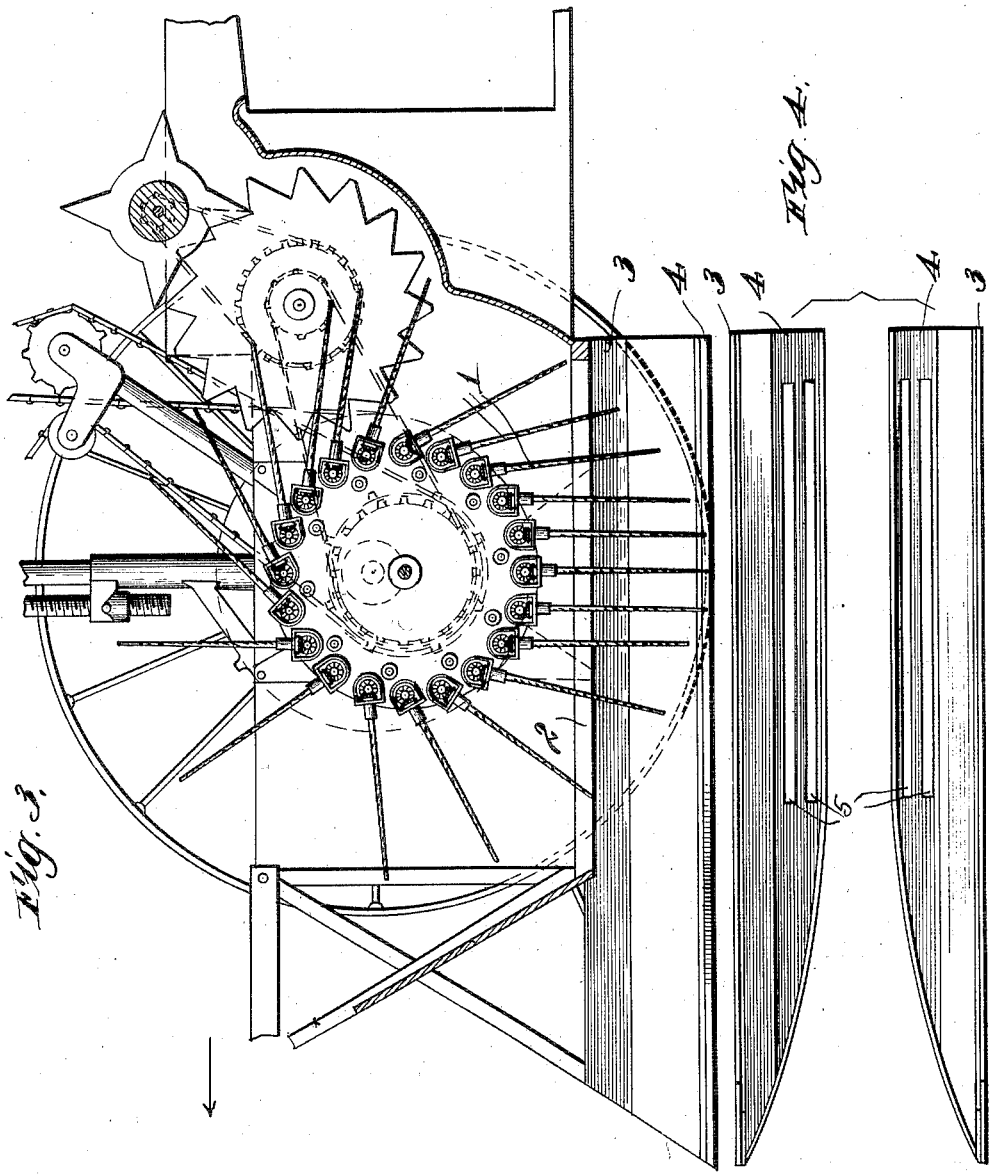

UNITED STATES PATENT OFFICE.

JOHN F. APPLEBY, OF BEAVER COUNTY, OKLAHOMA, ASSIGNOR TO DIXIE COTTON PICKER COMPANY, OF REDFIELD, SOUTH DAKOTA, A CORPORATION OF SOUTH DAKOTA.

COTTON-PICKING MACHINE.

1,078,327.     Specification of Letters Patent.     Patented Nov. 11, 1913.

Application filed July 23, 1908, Serial No. 444,909. Renewed May 27, 1913. Serial No. 770,279.

*To all whom it may concern:*

Be it known that I, JOHN F. APPLEBY, citizen of the United States, residing in the county of Beaver and State of Oklahoma, have invented a certain new and useful Improvement in Cotton-Picking Machines, of which the following is a full, clear, concise, and exact description, reference being had to the accompanying drawings, forming a part of this specification.

My invention relates to cotton picking machines, and has for its object the provision of means whereby the branches of the cotton plants are brought and maintained within range of the picking fingers. This object of my invention is gained by the employment of shelves, one flanking each side of the machine and separated a distance suited to permit the entry of the stalks or trunks of the cotton plants between the same, the branches of the cotton plants overhanging the shelves, the lower branches being supported thereby so as to be within the range of the picking fingers. The shelves are located sufficiently close to the ground so that they may pass underneath all of the branches, so that none of the branches will escape the action of the cotton picking fingers. The shelves not only act to support the branches of the plants within range of the cotton picking fingers, but also serve to prevent cotton from falling upon the ground, the loose cotton falling upon the shelves being ultimately gathered up by the picking fingers.

I will explain my invention more fully by reference to the accompanying drawings, showing the preferred embodiment thereof as applied to the machine of my Patent No. 798,651, dated September 5, 1905, wherein the picking fingers move in vertical planes, though I do not wish to be limited in all embodiments of the invention to machines in which the picking fingers move in these planes.

Figure 1:
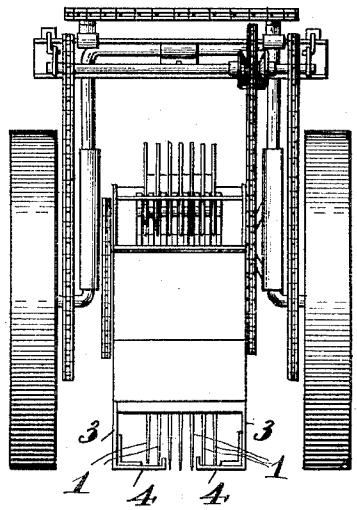
Figure 2:
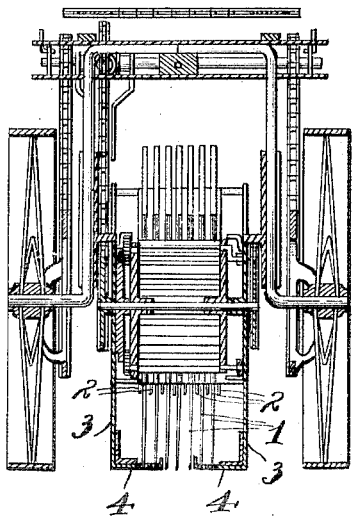

In the drawings—Figure 1 is an end elevation of a machine equipped in accordance with the present invention. Fig. 2 is a sectional end view of the structure shown in Fig. 1. Fig. 3 is a central longitudinal sectional view of an intermediate portion of the machine showing the novel features of my invention. Fig. 4 is a plan view of the shelving as it appears in the machine.

Like parts are indicated by similar characters of reference throughout the different figures.

I deem it unnecessary to describe the picking and other mechanism of the machine to which my invention is applied, as such mechanism is well illustrated and described in my aforesaid patent, to which I cause reference in order that the various parts of the machine not herein specifically related to may be understood, both as to their function and mode of operation. I would, however, make specific reference to the picking fingers 1 which move bodily in vertical planes which are parallel with the line of travel of the machine and are caused to enter and operate within the plants in substantially vertical lines, these picking fingers being adapted to pass through a perforated floor 2, being, in effect, a grate whose bars extend longitudinally of the machine, whereby the perforations in said floor extend longitudinally of the machine so as to coincide with the vertical planes of movement of the picking fingers. The perforated floor 2 serves to depress the cotton plants, whereby the branches of the cotton plants are mashed so that the cotton picking fingers are better able to pick the cotton from the plants. There are also provided in the machine of my aforesaid patent two side members 3 which act as gatherers to prevent the cotton plants from projecting laterally beyond the range of the picking fingers. In carrying out my present invention, these gatherers 3, which are vertically disposed, have horizontal continuations 4 which constitute the shelving of my invention, these horizontal continuations lying substantially close to the ground, so that as the machine passes over a row of plants, the branches of the plants will overlie the shelves 4, which are separated a suitable distance at the middle of the machine to permit of the reception of the stalks or trunks of the cotton plants, substantially all of whose branches are caused to overlie the shelves. These shelves are so related to the picking fingers that the ends of said picking fingers closely approach said shelves, whereby none of the cotton upon the branches which overhang the shelves is permitted to escape the picking fingers. The shelves 4 coöperate with the vertical gatherers 3 and the perforated floor or grate bars thoroughly to confine the cotton plants and maintain the same within the range of the cotton picking fingers, the said shelves being for the purpose made sufficiently rigid so that they will force the branches upwardly and will not be depressed by the pressure exerted upon the branches by the perforated floor and the vertical gatherers 3. Not only do the shelves thus support the branches of the plants, but any loose cotton falling thereupon is ultimately picked up by the fingers, so that said shelves perform the double purpose of enabling the picking fingers effectively to gather the cotton and to gather the cotton that would otherwise fall upon the ground.

Where the invention is adapted to a machine in which the picking fingers travel bodily in vertical planes and pass into, through and out of the bushes in substantially vertical lines, the shelves may be provided with perforations or slots 5, which receive the fingers so that the more aggressive parts of the fingers will be presented to the cotton upon the shelving or near the same.

It will be seen that the upper grated floor and the lower shafts constitute two channels, between which cotton plant portions are received, the cotton picking fingers extending substantially clear across said channels to pick the cotton from the plants.

Reference may be had to my co-pending applications Serial No. 412,709, filed January 27, 1908, and 446,831, filed August 3, 1908, wherein some claims have been included which are addressed to the extension of cotton picking fingers across the cotton plant receiving channel.

It is obvious that changes may readily be made by those familiar with the art, without departing from the spirit of my invention, and I do not, therefore, wish to be limited to the precise construction shown, but

Having thus described my invention, I claim as new and desire to secure by Letters Patent the following:—

1. A cotton picking machine having picking fingers and shelving running sufficiently close to the ground to underlie the branches of cotton plants, spaces being provided in the shelving within which the picking fingers are adapted to be received.

2. A cotton picking machine having picking fingers and two shelves running sufficiently close to the ground to underlie branches of cotton plants, said shelves being supported upon opposite sides of the machine and sufficiently separated to permit entry of the stalks or trunks of cotton plants between the shelves, spaces being provided in the shelves within which the picking fingers are adapted to be received.

3. A cotton picking machine including picking fingers that travel bodily in vertical planes parallel with the direction of travel of the machine and having shelving running sufficiently close to the ground to underlie branches of cotton plants.

4. A cotton picking machine including picking fingers that travel bodily in vertical planes parallel with the direction of travel of the machine and having two shelves running sufficiently close to the ground to underlie branches of cotton plants, said shelves being supported upon opposite sides of the machine and sufficiently separated to permit entry of the stalks or trunks of cotton plants between the shelves.

5. A cotton picking machine having a channel within which cotton plant portions may be received, and cotton picking mechanism including picking fingers adapted to extend substantially across said channel to pick cotton from the plant portions interposed between the walls of said channel, the wall of the channel opposite the bases of the fingers being cut away to receive the free ends of the fingers.

6. A cotton picking machine having a channel within which cotton plant portions may be received, and cotton picking mechanism including picking fingers adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers.

7. A cotton picking machine having a channel within which cotton plant portions may be received, and cotton picking mechanism including picking fingers moving in vertical planes adapted to extend substantially across said channel to pick cotton from the plant portions interposed between the walls of said channel.

8. A cotton picking machine having a channel within which cotton plant portions may be received, and cotton picking mechanism including picking fingers moving in vertical planes adapted to extend substantially across said channel to pick cotton from the plant portions interposed between the walls of said channel, the wall of the channel adjacent to the bases of the fingers being slotted to permit the fingers to pass therethrough.

9. A cotton picking machine having a channel within which cotton plant portions may be received, and cotton picking mechanism including picking fingers moving in vertical planes adapted to extend substantially across said channel to pick cotton from the plant portions interposed between the walls of said channel, the wall of the channel opposite the bases of the fingers being cut away to receive the free ends of the fingers.

10. A cotton picking machine having a channel within which cotton plant portions may be received, and cotton picking mechanism including picking fingers moving in vertical planes adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers.

11. A cotton picking machine having picking fingers and shelving running sufficiently close to the ground to underlie the branches of cotton plants, spaces being provided in the shelving within which the picking fingers are adapted to be received, and picking finger operating mechanism operated by the machine in traveling.

12. A cotton picking machine having picking fingers and two shelves running sufficiently close to the ground to underlie branches of cotton plants, said shelves being supported upon opposite sides of the machine and sufficiently separated to permit entry of the stalks or trunks of cotton plants between the shelves, spaces being provided in the shelves within which the picking fingers are adapted to be received, and picking finger operating mechanism operated by the machine in traveling.

13. A cotton picking machine including picking fingers that travel bodily in vertical planes parallel with the direction of travel of the machine and having shelving running sufficiently close to the ground to underlie branches of cotton plants, and picking finger operating mechanism operated by the machine in traveling.

14. A cotton picking machine including picking fingers that travel bodily in vertical planes parallel with the direction of travel of the machine and having two shelves running sufficiently close to the ground to underlie branches of cotton plants, said shelves being supported upon opposite sides of the machine and sufficiently separated to permit entry of the stalks or trunks of cotton plants between the shelves, and picking finger operating mechanism operated by the machine in traveling.

15. A cotton picking machine having a channel within which cotton plant portions may be received, and cotton picking mechanism operated by the machine in traveling and including picking fingers adapted to extend substantially across said channel to pick cotton from the plant portions interposed between the walls of said channel, the wall of the channel opposite the bases of the fingers being cut away to receive the free ends of the fingers.

16. A cotton picking machine having a channel within which cotton plant portions may be received, and cotton picking mechanism operated by the machine in traveling and including picking fingers adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers.

17. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel.

18. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, the wall of the channel adjacent to the bases of the fingers being slotted to permit the fingers to pass therethrough.

19. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, the wall of the channel opposite the bases of the fingers being cut away to receive the free ends of the fingers.

20. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers.

21. A cotton picking machine including a channel within which cotton plant portions may be received, and cotton picking mechanism including picking fingers moving in vertical planes adapted to extend substantially across said channel to pick cotton from the plant portions interposed between the walls of said channel, said cotton picking fingers traveling bodily in their vertical planes of movement, said planes of movement being substantially parallel with the line of travel of the machine.

22. A cotton picking machine having a channel within which cotton plant portions may be received, and cotton picking mechanism including picking fingers moving in vertical planes adapted to extend substantially across said channel to pick cotton from the plant portions interposed between the walls of said channel, the wall of the channel adjacent to the bases of the fingers being slotted to permit the fingers to pass therethrough, said cotton picking fingers traveling bodily in their vertical planes of movement, said planes of movement being substantially parallel with the line of travel of the machine.

23. A cotton picking machine having a channel within which cotton plant portions may be received, and cotton picking mechanism including picking fingers moving in vertical planes adapted to extend substantially across said channel to pick cotton from the plant portions interposed between the walls of said channel, the wall of the channel opposite the bases of the fingers being cut away to receive the free ends of the fingers, said cotton picking fingers traveling bodily in their vertical planes of movement, said planes of movement being substantially parallel with the line of travel of the machine.

24. A cotton picking machine having a channel within which cotton plant portions may be received, and cotton picking mechanism including picking fingers moving in vertical planes adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers, said cotton picking fingers traveling bodily in their vertical planes of movement, said planes of movement being substantially parallel with the line of travel of the machine.

25. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, said cotton picking fingers traveling bodily in their vertical planes of movement, said planes of movement being substantially parallel with the line of travel of the machine.

26. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, the wall of the channel adjacent to the bases of the fingers being slotted to permit the fingers to pass therethrough, said cotton picking fingers traveling bodily in their vertical planes of movement, said planes of movement being substantially parallel with the line of travel of the machine.

27. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, the wall of the channel opposite the bases of the fingers being cut away to receive the free ends of the fingers, said cotton picking fingers traveling bodily in their vertical planes of movement, said planes of movement being substantially parallel with the line of travel of the machine.

28. A cotton picking machine having a channel within which cotton plant portions may be received, and cotton picking mechanism operated by the machine in traveling and including picking fingers moving in vertical planes adapted to extend substantially across said channel to pick cotton from the plant portions interposed between the walls of said channel, the wall of the channel adjacent to the bases of the fingers being slotted to permit the fingers to pass therethrough, the wall of the channel opposite the bases of the fingers being cut away to receive the free ends of the fingers, said cotton picking fingers traveling bodily in their vertical planes of movement, said planes of movement being substantially parallel with the line of travel of the machine.

29. A cotton picking machine having a channel within which cotton plant portions may be received, and cotton picking mechanism including picking fingers adapted to extend entirely across said channel to pick cotton from the plant portions interposed between the walls of said channel.

30. A cotton picking machine having a channel within which cotton plant portions may be received, and cotton picking mechanism including picking fingers adapted to extend entirely across said channel to pick cotton from the plant portions interposed between the walls of said channel, the wall of the channel adjacent to the bases of the fingers being slotted to permit the fingers to pass therethrough.

31. A cotton picking machine having a channel within which cotton plant portions may be received, and cotton picking mechanism operated by the machine in traveling and including picking fingers adapted to extend entirely across said channel to pick cotton from the plant portions interposed between the walls of said channel.

32. A cotton picking machine having a channel within which cotton plant portions may be received, and cotton picking mechanism operated by the machine in traveling and including picking fingers adapted to extend entirely across said channel to pick cotton from the plant portions interposed between the walls of said channel, the wall of the channel adjacent to the bases of the fingers being slotted to permit the fingers to pass therethrough.

33. In a cotton harvester, the combination, with a suitable vehicle, of rotating picking fingers, and a guard, said guard being located close to the ground over which the machine is moving and adapted to cover the ground adjacent to the cotton bushes, there being longitudinal slots in said guard for the passage of the picking fingers.

34. In a cotton harvester, the combination, with a suitable vehicle, of rotating picking fingers, and a guard, said guard being located close to the ground over which the machine is moving and adapted to cover the ground adjacent to the cotton bushes, there being longitudinal passage ways in said guard for the passage of the stalks of the plants and slots for the passage of the picking fingers.

35. In a cotton harvester, a vehicle; suitable means for picking the cotton, including revolving picking fingers, a guard consisting of two companion members, placed a proper distance apart, said guard being located in close proximity to the ground over which the machine is being moved and adapted to cover the ground adjacent to the plants while being picked, there being in said guard a central passage having an enlarged entrance-opening for the stalks of the plants and slotted apertures for the entrance of the picking fingers.

36. In a cotton harvester, a vehicle, suitable mechanism for picking the cotton and means for compressing the cotton-bush said means consisting of a receptacle, the bottom of which is located in close proximity to the ground over which the vehicle is moving and adapted to cover the ground adjacent to the plants and close to the stalks thereof while being picked.

37. In a cotton harvester, a vehicle and mechanism for picking the cotton including revolving picking fingers, a passage through which the cotton bushes are passed, said passage being composed of four walls and of comparatively limited compass so as to compress the bushes into small space and moving over the ground in close proximity thereto.

38. In a cotton harvester, a vehicle, and mechanism for picking the cotton including intermittently revolving picking fingers, a passage through which the cotton bushes are passed, said passage being composed of four walls the opposing two of which are slotted for the object specified.

39. In a cotton harvester, a vehicle; mechanism mounted upon said vehicle for picking the cotton including revolving picking fingers, a passage of comparatively limited compass through which the cotton bushes are passed while being picked, said passage being composed of four walls the opposing two of which are slotted for the passage of the stalks of the plant and the picking fingers respectively, the bottom member of said passage being in close proximity to the ground and covering the same adjacent to the cotton plants while being picked.

In witness whereof, I hereunto subscribe my name this 20th day of July A. D., 1908.

JOHN F. APPLEBY.

Witnesses:
L. E. STROH,
L. JOSEF.